United States Patent [19]
Hejlsberg et al.

[11] Patent Number: 6,151,602
[45] Date of Patent: Nov. 21, 2000

[54] DATABASE SYSTEM WITH METHODS PROVIDING A PLATFORM-INDEPENDENT SELF-DESCRIBING DATA PACKET FOR TRANSMITTING INFORMATION

[75] Inventors: Anders Hejlsberg, Seattle, Wash.; Kurt Hansen, Aptos, Calif.

[73] Assignee: Inprise Corporation, Scotts Valley, Calif.

[21] Appl. No.: 09/047,924

[22] Filed: Mar. 25, 1998

(Under 37 CFR 1.47)

Related U.S. Application Data

[60] Provisional application No. 60/064,920, Nov. 7, 1997.
[51] Int. Cl.[7] .................................................. G06F 17/30
[52] U.S. Cl. ............................. 707/10; 707/101; 709/201
[58] Field of Search ....................... 707/10, 101; 709/201

[56] References Cited

U.S. PATENT DOCUMENTS

| | | | |
|---|---|---|---|
| 5,293,379 | 3/1994 | Carr | 370/474 |
| 5,483,522 | 1/1996 | Derby et al. | 370/400 |
| 5,701,302 | 12/1997 | Geiger | 370/521 |
| 5,805,808 | 9/1998 | Hasani et al. | 709/243 |
| 5,930,786 | 7/1999 | Carino, Jr. et al. | 707/4 |

OTHER PUBLICATIONS

Feldman, Phil (Using Visual Basic 3, Que, p. 1003), 1993

*Primary Examiner*—Thomas G. Black
*Assistant Examiner*—William Trinh
*Attorney, Agent, or Firm*—John S. Smart

[57] ABSTRACT

A three-tier data processing system of the present invention includes a client application, operating on a client machine (i.e., first tier), which obtains data from a back-end data source (e.g., database server) by submitting a request (e.g., SQL query) to a middle tier. The middle tier, in turn, comprises a provider and a resolver. Data is actually returned to the client by means of a "data packet" of the present invention, which is a platform-independent self-describing data format used to exchange data between different subsystems of the architecture. A data packet normally represents a result set, which is received by a client from a remote server, containing both data and metadata. Upon receiving the data packet from the provider, the client unpacks the data and then proceeds to process and manipulate the data as if it were local data (e.g., for insert, deletes, updates, and the like). Additional data packets are provided for special purpose use, including a "delta" data packet, used when applying client updates, and an "error" data packet, used to report results (including errors, after a failed update attempt) back to a client. The resolver, upon receiving a delta data packet, applies logic for effecting the user-specified modifications to the data set present at the back end. In the event that the resolver is unable to apply the user-specified modifications, it reports the failed operation back to the client via an error data packet.

21 Claims, 6 Drawing Sheets

DATABASE SYSTEM WITH METHODS PROVIDING A PLATFORM-INDEPENDENT SELF-DESCRIBING DATA PACKET FOR TRANSMITTING INFORMATION

The present application claims the benefit of priority from commonly-owned application Ser. No. 60/064,920, filed Nov. 7, 1997, the disclosure of which is hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to the field of data processing and, more particularly, to methods and apparatus for platform-independent transmission of information among computer systems.

Today, most computers are linked to other computer systems via a computer network. Well-known examples of computer networks include local-area networks (LANs) where the computers are geographically close together (e.g., in the same building), and wide-area networks (WANs) which the computers are farther apart and are connected by telephone lines or radio waves.

Often, networks are configured as "client/server" networks, such that each computer on the network is either a "client" or a "server." Servers are powerful computers or processes dedicated to managing shared resources, such as storage (i.e., disk drives), printers, modems, or the like. Servers are often dedicated, meaning that they perform no other tasks besides their server tasks. For instance, a database server is a computer system that manages database information, including processing database queries from various clients.

The client part of this client-server architecture typically comprises PCs or workstations which rely on a server to perform some operations. Typically, a client runs a "client application" that relies on a server to perform some operations, such as returning particular database information. Often, client-server architecture is thought of as a "two-tier architecture," one in which the user interface runs on the client or "front end" and the database is stored on the server or "back end." The actual business rules or application logic driving operation of the application can run on either the client or the server (or even be partitioned between the two).

A newer client/server architecture, called a three-tier architecture, introduces three well-defined and separate processes, each typically running on a different platform:

1. First tier: The user interface, which runs on the user's computer (i.e., the client).
2. Second tier: The functional modules that actually process data. This middle tier runs on a server and is often called the application server.
3. Third tier: A database management system (DBMS) that stores the data required by the middle tier. This tier runs on a second server called the database server.

The three-tier design has many advantages over traditional two-tier or single-tier designs. For example, the added modularity makes it easier to modify or replace one tier without affecting the other tiers. Separating the application functions from the database functions makes it easier to implement load balancing. The three tiers do not necessarily represent three physical tiers, however, as all tiers could be implemented on a single machine. For example, an application server can run as a separate process on the same machine as a client application, with access being provided to local tables through a local database engine (e.g., Borland Database Engine or "BDE," available from Borland International, of Scotts Valley, Calif.).

When data is transmitted from the so-called middle tier to the client or server, a protocol is required. A particular problem arises when data is transmitted from one platform or media to another. With the explosive growth of the Internet and the World Wide Web, an ever-increasing number of computers of disparate platforms are being connected together each day, leading to an ever-increasing number of heterogeneous networked environments. In order for data to be transmitted effortlessly across platforms, a solution is needed which is not only independent of platform but is also independent of any communication protocol employed. Present-day solutions are tied to a particular platform. For instance, Microsoft DCOM (Distributed Common Object Model) is tied to the Windows platform and is, therefore, not well suited for other environments or platforms, such as Java-based environments. In order for data to be transmitted effortlessly across platforms, a solution is needed which is not only independent of platform but is also independent of any communication protocol employed.

Further, as computing becomes more distributed, there is increasing interest in implementing "thin client" solutions. A thin client is one in which resources required at the client machine are fairly nominal. The client is designed to be especially small so that the bulk of the data processing occurs on the server. Advantages of the thin client approach are numerous. For instance, a thin client generally requires less computational resources and, hence, can be implemented with less expensive machines (e.g., network computers). Also, a thin client typically maintains minimum business logic at the client, thus minimizing or eliminating the need to upgrade individual client machines when business logic changes. Therefore, transmission of data should occur in a manner which preserves thin client architecture— that is, a manner in which it is independent of data source. Here, a given client need not know the data types originally available on the server.

SUMMARY OF THE INVENTION

A three-tier data processing system of the present invention includes a client application, operating on a client machine (first tier), which obtains data from a back-end data source (e.g., database server) by submitting a request (e.g., SQL query) to a middle tier. The middle tier, in turn, comprises a provider and a resolver. The provider, in response to the request, will undertake the necessary steps to get the data from the data source (e.g., SQL database tables) located on a database server operating on the back end or third tier. The request is honored by the provider returning a data "snapshot" of the requested data or "result data set." Data is actually returned to the client by means of a "data packet" of the present invention, which is a platform-independent self-describing data format used to exchange data between different subsystems of the architecture.

A data packet binary image or layout includes a header, a variable number of column descriptors, a variable number of optional parameters, and a variable number of rows containing the actual row data. The column descriptors and the optional parameters together comprise the metadata for the data packet. The core metadata is provided by the column descriptors. Each column descriptor fully characterizes a particular column, including specifying a name and data type for the column. The optional parameters specify additional metadata, including descriptors describing any indexes on the data set as well as descriptors describing constraints (e.g., referential integrity and primary key constraints) on the data set. As another example, the optional parameters can specify that a data set is read only, which is helpful, for instance, when a data set is the result of a join operation between two or more tables. Since the data packet is extensible, the client application can add its own user-defined optional parameters (which are passed along with the data packet).

The row data section of a data packet includes the actual data of the data set. In the currently-preferred embodiment, only actual data is transmitted. If a data row contains a null value, for instance, no data is transmitted. Thus, in contrast to conventional storage methodology, null data is not stored by padding out to a fixed length storage unit. This is made possible since the client has access to descriptor information and is able to correctly interpret the data row information as it is streamed in. By eliminating non-information and given the streaming format, the system can transmit data in a compact format, one which it is optimized for transmission across a communication network.

A data packet, which normally contains both data and metadata, represents a result set received by a client from a data source (e.g., a remote server). Upon receiving the data packet, the client unpacks the data and then proceeds to process and manipulate the data as if it were local data (e.g., for insert, deletes, updates, and the like). Additional data packets are provided for special purpose use, including a "delta" data packet, used when applying client updates, and an "error" data packet, used to report results back to a client, including errors after a failed update attempt. Both of these data packets have the same layout and structure as a normal data packet, but the data content is interpreted in a slightly different manner. The resolver, upon receiving a delta data packet, applies logic for effecting the user-specified modifications to the data set present at the back end. In the event that the resolver is unable to apply the user-specified modifications, it generates an error data packet for communicating the results of its operations back to the client, including information about why the error occurred.

DETAILED DESCRIPTION OF A PREFERRED EMBODIMENT

The following description will focus on a preferred embodiment of the present invention (and certain alternatives) embodied in a development environment running on an Intel 80×86-compatible computer operating under an event-driven operating system, such as the Microsoft® Windows environment. The present invention, however, is not limited to any particular application or any particular environment. Instead, those skilled in the art will find that the system and methods of the present invention may be advantageously applied to a variety of platforms and environments, whether command-line or GUI based, including MS-DOS, Macintosh, UNIX, NextStep, and the like. Therefore, the description of the exemplary embodiments which follows is for purposes of illustration and not limitation.

General Architecture

A. System Hardware

Figure 1A:
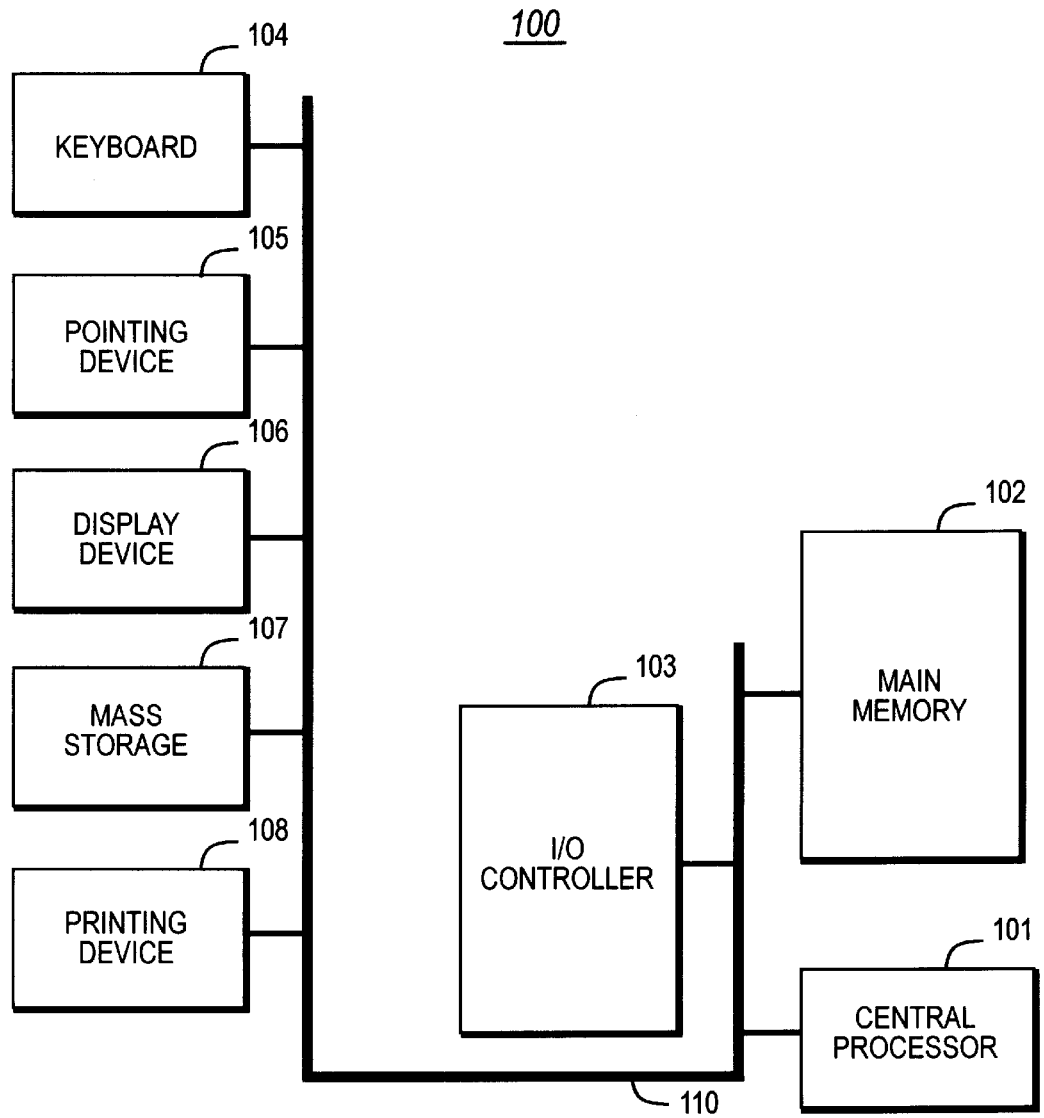
FIG. 1A is a block diagram of a computer system in which the present invention may be embodied.

The present invention may be embodied on a computer system such as the system 100 of FIG. 1A, which includes a central processor(s) 101, a main memory 102, an input/output controller 103, a keyboard 104, a pointing device 105, a display device 106, and a mass storage 107 (e.g., removable disk, floppy disk, fixed disk, optical disk (including CD-ROM), and the like), connected through a system bus 110 or similar architecture.

In operation, program logic (implementing methodologies described below) is loaded from the storage device or mass storage 107 into the main memory 102, for execution by the processor 101. During operation of the program (logic), the user enters commands through the keyboard 104 and/or pointing device 105, which is typically a mouse, a track ball, or the like. The computer system displays text and/or graphic images and other data on the display device 106, such as a cathode-ray tube or an LCD display. A hard copy of the displayed information, or other information within the system 100, may be obtained from the printing device 108. In a preferred embodiment, the computer system 100 includes an IBM PC-compatible personal computer (available from a variety of vendors, including IBM of Armonk, N.Y.) running Windows 9x or Windows NT (available from Microsoft Corporation of Redmond, Wash.).

B. System Software

Figure 1B:
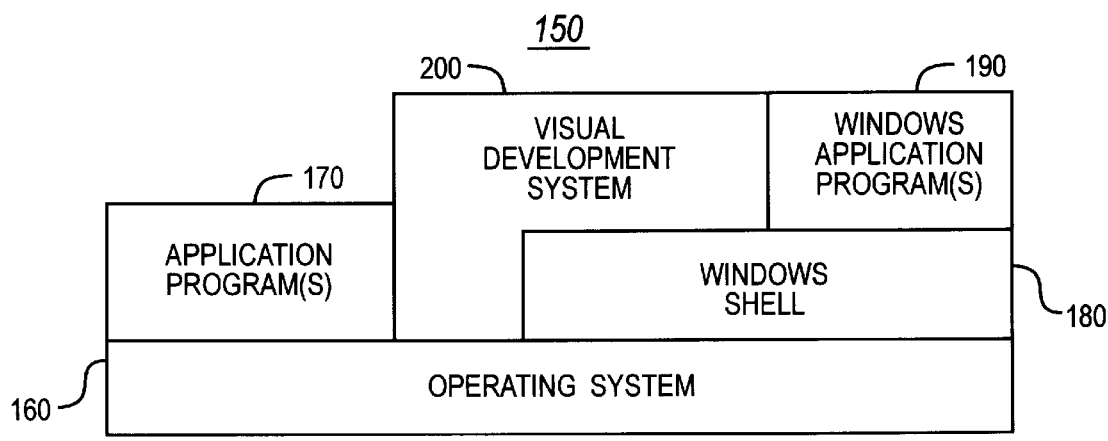
FIG. 1B is a block diagram of a software system for controlling the operation of the system of FIG. 1A.

Illustrated in FIG. 1B, a computer software system 150 is provided for directing the operation of the computer system 100. Software system 150, which is stored in system memory 102 and/or on disk storage 107, includes a kernel or operating system (OS) 160 and a windows-based shell or interface 180. One or more application programs, such as application programs 170 or windows applications programs 190, may be "loaded" (i.e., transferred from storage 107 into memory 102) for execution by the system 100. OS 160 and shell 180, as well as application software 170, 190, include an interface for receiving user commands and data and displaying results and other useful information. Software system 150 also includes a visual development system 200 of the present invention for developing system and application programs. As shown, the development system 200 includes components which interface with the system 100 through windows shell 180, as well as components which interface directly through OS 160.

In a preferred embodiment, operating system 160 and shell 180 are provided by Microsoft Windows 9x/NT, available from Microsoft Corporation of Redmond, Wash. Those skilled in the art will appreciate that the system may be implemented in other platforms, including Macintosh, UNIX, and the like. Application software 170, 190 can be any one of a variety of software applications, such as word processing, database, spreadsheet, text editors, and the like, including those created by the development system 200, which is now described in greater detail.

C. Development System

Figure 2:
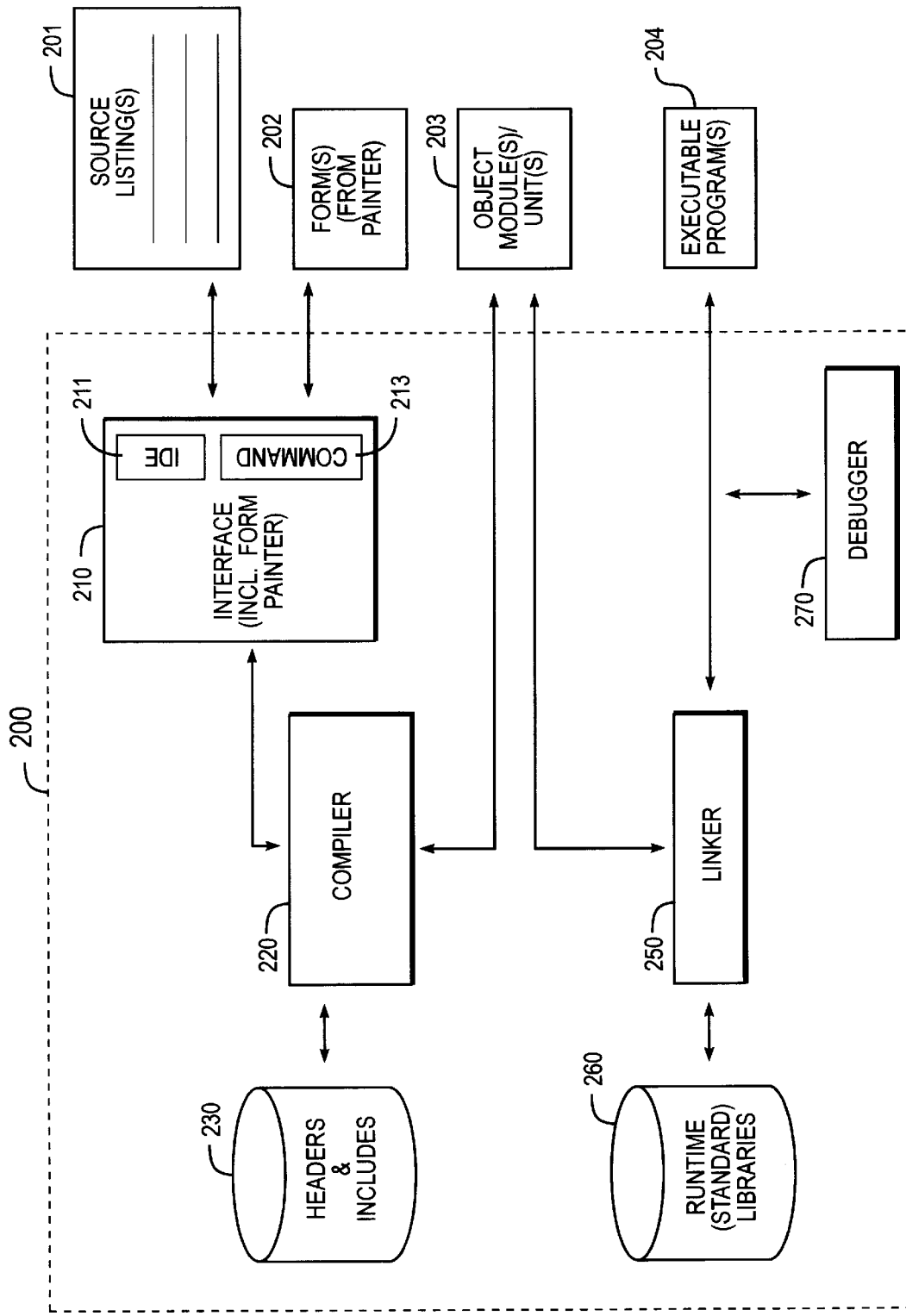
FIG. 2 is a block diagram of a visual development system of the present invention for creating client-side application programs requiring data access.

Shown in further detail in FIG. 2, the visual development system 200 of the present invention includes a compiler 220, a linker 250, an interface 210, and a debugger 270. Through the interface, the developer user "paints" forms 202 with objects and supplies source listings 201 to the compiler 220. Interface 210 includes both command-line driven 213 and Integrated Development Environment (IDE) 211 interfaces, the former accepting user commands through command-line parameters, the latter providing menuing equivalents thereof. From the source code or listings 201, forms 202, and headers/includes files 230, the compiler 220 "compiles" or generates object module(s) or "units" 203. In turn, linker 250 "links" or combines the units 203 with runtime libraries 260 (e.g., standard runtime library functions) to generate program(s) 204, which may be executed by a target processor (e.g., processor 101 of FIG. 1A). The runtime libraries 260 include previously-compiled standard routines, such as graphics, I/O routines, startup code, math libraries and the like. In typical use, the development system is employed to create an executable program comprising a client-side database application program, which interacts with a remote data source (i.e., one present on another computer).

A description of the general operation of development system 200, particularly for creating client-side database application programs, is provided in the manuals accompanying the commercial embodiment of Borland Delphi™ 3: Users Guide (Part No. HDA1330WW21770), Developer's Guide (Part No. HDA1330WW21772). Further description can be found in Object Pascal Language Guide (Part No. HDA1330WW21771) and Visual Component Library Reference, Vol. 1 (Part No. HDA1330WW21773) and Vol. 2 (Part No. HDA1330WW21774). The disclosures of each of the foregoing (which are available directly from Borland International of Scotts Valley, Calif.) are hereby incorporated by reference. Further description of operation of the development system can be found, for example, in commonly-owned, co-pending application entitled DEVELOPMENT SYSTEMS WITH METHODS FOR TYPE-SAFE DELEGATION OF OBJECT EVENTS TO EVENT HANDLERS OF OTHER OBJECTS, U.S. patent application Ser. No. 08/594,928, filed Jan. 31, 1996, the disclosure of which is hereby incorporated by reference.

As described below, the present invention operates in conjunction with a database management system. For purposes of the present invention, a conventional database management system can be employed for this purpose. Examples of suitable database systems include Sybase SQL Server™ (available from Sybase, Inc. of Emeryville, Calif.), Oracle™ 8 (available from Oracle Corp. of Redwood Shores, Calif.), and Borland Interbase™ (available from Borland International, Inc. of Scotts Valley, Calif.). The general construction and operation of a database management system, including "client/server" relational database systems, is known in the art. See e.g., Date, C., *An Introduction to Database Systems*, Volume I and II, Addison Wesley, 1990; the disclosure of which is hereby incorporated by reference. A more technical review is provided by Gray, J. and Reuter, A., *Transaction Processing: Concepts and Techniques*, Morgan Kaufmann Publishers, 1993, the disclosure of which is hereby incorporated by reference.

The following description will focus on those features of the development system 200 which are helpful for understanding methods of the present invention for implementing a platform-independent self-describing data packet for transmitting information.

Platform-independent Self-describing Data Packet

A. Overview of use of "data packet" in Three-tier Architecture

Figure 3:
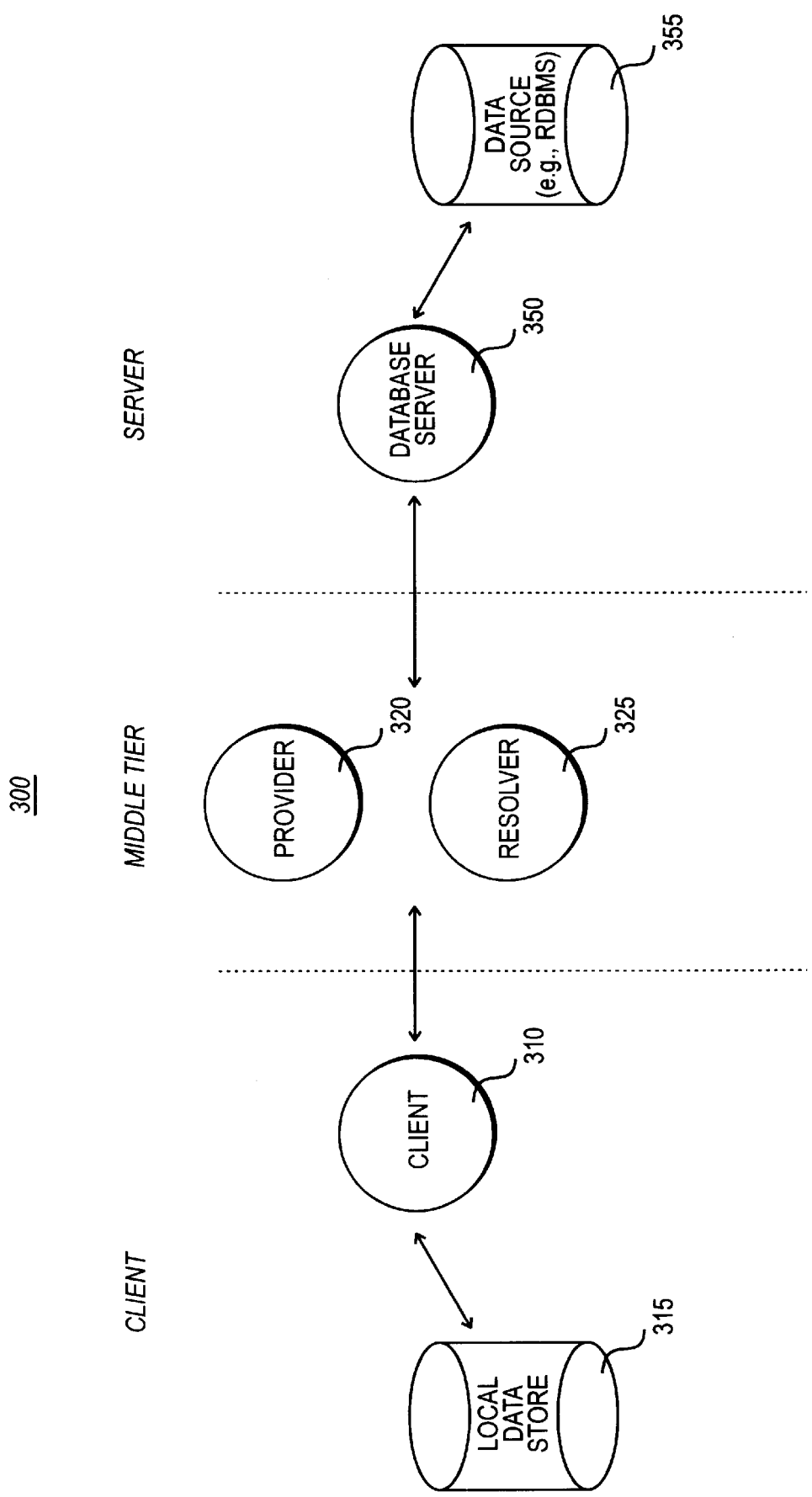
FIG. 3 is a block diagram illustrating basic architecture of a three-tier data processing system in which use of the data packet of the present invention is preferably employed.

FIG. 3 is a block diagram summarizing the basic architecture of a three-tier data processing system 300 in which use of the present invention is advantageous. As shown, the system 300 includes a client application 310 (e.g., created by Borland Delphi™) operating on a client machine (first tier). To obtain data, the client application 310 submits a request (e.g., SQL query) to a middle tier. This second or middle tier comprises two components: a provider 320 and a resolver 325. The provider 320, in response to the request, will undertake the necessary steps to get the data from a data source 355 (e.g., SQL database tables) located on a database server 350 operating on the back end or third tier. The logic usually provided by a local database engine (e.g., Borland Database Engine (BDE) from Borland International, Inc. of Scotts Valley, Calif.) for communication with the server or back end data store is encapsulated in the provider component 320. Thus for data access, the system operates by the client generating a request for data. The request is honored by the provider 320 returning a data "snapshot" of the requested data or "result data set," which itself is stored in a local data store or cache, shown at 315.

The means by which the data is actually returned to the client is through use of a "data packet" of the present invention. The data packet serves as the messenger or the communicator of the data. Upon receiving the data packet, the client unpacks the data and then proceeds to process and manipulate the data as if it were local data (e.g., for insert, deletes, updates, and the like). From the perspective of the user, however, the mechanism is transparent: there is no difference between opening a data packet for use or opening a local table for use.

The data packet is a platform-independent self-describing data format, used to exchange data between different subsystems of the architecture. It is also used as a file format, when storing data temporarily to disk. A data packet normally represents a result set received by a client from a remote server, containing both data and metadata. Additional data packets are provided, however, for special purpose use. These include, for instance, a "delta" data packet, used when applying client updates, and an "error" data packet, used to report results and errors (e.g., a failed update attempt) back to a client. Both of these data packets have the same layout and structure as a normal data packet, but the data content is interpreted in a slightly different manner. Normally it will be clear from the context which kind of data packet is used, but the data packet also contains an indicator for its kind.

The resolver 325, upon receiving a delta data packet, applies logic for effecting the user-specified modifications to the data set present at the back end. In the event that the resolver 325 is unable to apply the user-specified modifications, it generates an error data packet for reporting the results of its operations back to the client, including reporting any errors which occurs. The reporting of errors includes information about the values of any conflicting data values that caused the update operation to fail.

General characteristics of a data packet include:

(1) Sequential or "streamed": Except for a fixed size header, the contents of a data packet is variable length, and is accessed sequentially, one piece of information at a time. This approach allows the system to process data while it is still being received; this is important, for instance, for data being received across the Internet.

(2) Self-contained and self-describing: The data package itself contains all the information necessary for unpacking and interpreting the data. The structure of the data in a data packet is described using metadata. The metadata information includes column descriptors and special attributes. The column descriptors, which are based on a basic set of data types, are employed to characterize each column (e.g., by name and data type). Special attributes of the data are described using optional parameters. Special semantics of the data, like update semantics, constraints, and ordering, are likewise described using optional parameters. Through use of the metadata, the client has full knowledge of the data set, including understanding indexes on the data set (useful for catching key violations which occur at the client) as well as understanding referential integrity constraints present on the data set.

(3) Extensible: Optional parameters allow for new data or object types (i.e., user-defined types), or attributes to be added seamlessly, as long as both sender and receiver understands their meaning.

(4) Embedded edit-log: Changes made to the data in a data packet can be stored within the data packet itself, using a "RowStatus" column, and a "Change" log, thus providing support for the so-called "Briefcase" model.

(5) Compression: Simple compression is performed by eliminating transmission of data for null-values and by making string and bytes columns variable length.

A data packet representing ordinary data can be "partial," meaning the total data content is divided into multiple data packets. In this case, only the first data packet contains metadata describing the data. The subsequent data packets merely include an data packet identifier (i.e., type partial, stored in the header) and data rows. Partial data packets are used to reduce data-traffic when the user just wants to see the first N number of rows of the results set, and later fetch the next set of rows in a partial data packet (e.g., as the user scrolls to the end). If the user scrolls down the entire set, he or she will eventually assemble the full result set. In this manner, the partial data packet provides "on demand" data delivery.

B. Overall Image of a Data Packet

Figure 4:
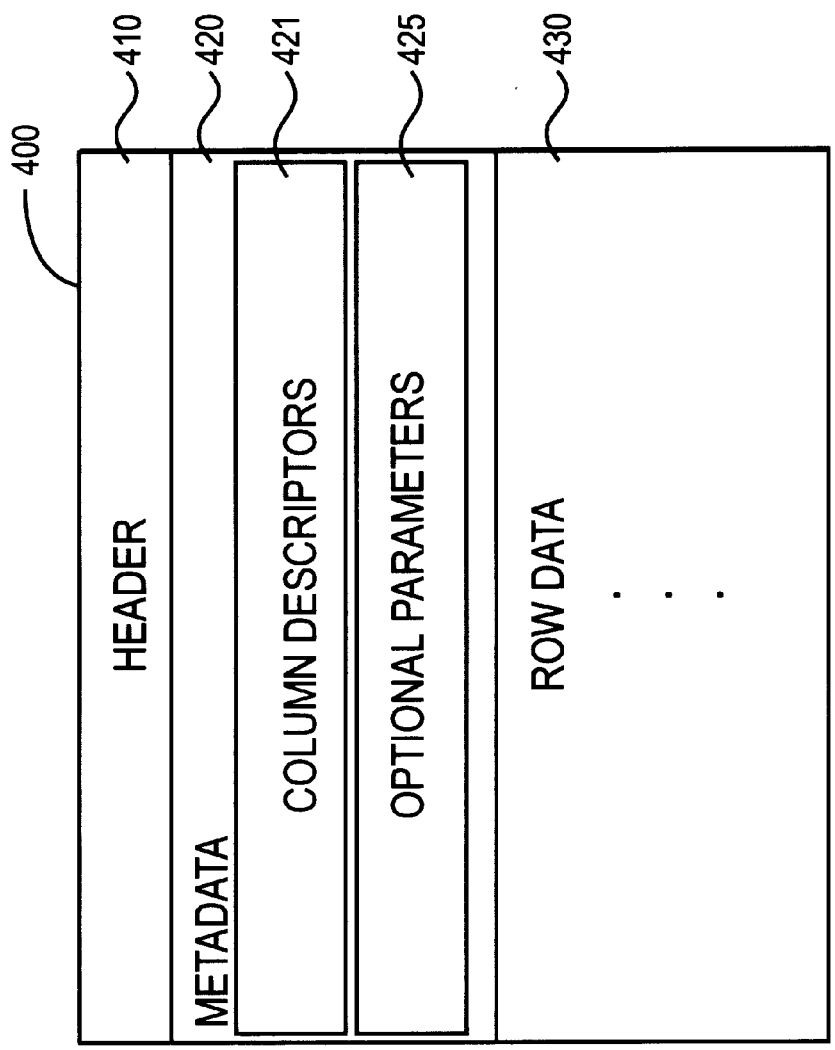
FIG. 4 is a block diagram illustrating a data packet's binary image or layout.

As shown in FIG. 4, a data packet binary image or layout 400 includes a header 410, a variable number of column descriptors 421, a variable number of optional parameters 425, and a variable number of rows 430 containing the actual row data. These will be examined in greater detail.

The column descriptors and the optional parameters together comprise the metadata 420 for the data packet. The core metadata is provided by the column descriptors. Each column descriptor fully characterizes a particular column, including specifying a name and data type for the column. The optional parameters specify additional metadata, including descriptors describing any indexes on the data set as well as descriptors describing entity integrity (i.e., primary key) and referential integrity constraints on the data set. As another example, the optional parameters can specify that a data set is read only, which is helpful, for instance, when a data set is the result of a join operation between two or more tables. Since the data packet is extensible, a component of the system (e.g., application server or client application) can register its own user-defined optional parameters (which are passed along with the data packet).

Row data 430 includes the actual data of the data set. In the currently-preferred embodiment, only actual data is transmitted. If a data row contains a null value, for instance, no data is transmitted. Thus, in contrast to conventional storage methodology, null data is not stored by padding out to a fixed length storage unit. This is made possible since the client has access to descriptor information and is able to correctly interpret the data row information as it is streamed in. By eliminating non-information and given the streaming is format, the system can transmit data in a compact format, one which it is optimized for transmission across a communication network.

C. Intrinsic Types, and Type Descriptors

The following table lists the intrinsic types that are used by data fields of the various sections of a data packet.

TABLE 1

Intrinsic types

| Type | Description |
| --- | --- |
| Int8 | 8-bit unsigned integer. |
| Int16 | 16-bit unsigned integer. |
| Int32 | 32-bit unsigned integer. |
| String | String stored as a length byte followed by that many characters. |

All multi-byte values in a data packet (e.g., 16- and 32-bit integers) are stored in little endian format (i.e., least significant byte first).

The data types of columns and optional parameters in a data packet are defined through 32-bit type descriptors.

Table 2 below shows the layout of a type descriptor.

TABLE 2

Type descriptor format

| Bits | Meaning | Description |
|---|---|---|
| 0 ... 15 | Size | Size indicator (1 ... 64k). For a fixed size type this field gives the size in bytes of the data. For a varying size type this field gives the size in bytes (1, 2, or 4) of the byte count (8-, 16-, or 32-bit) that prefixes the data. |
| 16 ... 21 | Type | Type indicator (0 ... 63). This field indicates how the data should be interpreted. |
| 22 | Varying | 0 = Fixed size type, 1 = Varying size type. For a fixed size type, the Size field gives the size in bytes of the data. For a varying size type, the Size field gives the size in bytes (1, 2, or 4) of the length indicator that prefixes the data. |
| 23 | Array | 0 = Single element, 1 = Array. For an array, the data consists of a 32-bit element count followed by that many elements. |
| 24 ... 31 | Unused | |

Type descriptors are structured such that an implementation can learn the size of the data of a given type without understanding how the data is actually interpreted.

Two basic categories of data types are provided: fixed-sized and varying-sized types. Fixed-size types include, for instance, integers and floats. Varying-size types include, for instance, strings and blobs. In the current embodiment, data of a fixed size type can occupy between 1 and 64 k bytes. Data of a varying size type can occupy up to 4 GB, and is always prefixed by an 8-, 16-, or 32-bit length indicator that specifies the actual size of the data that follows. For an array data type, the actual data consists of a 32-bit element count followed by that many elements. The data of each element is formatted according to the type descriptor.

The Type field of a type descriptor indicates how the data should be interpreted. Table 3 lists the defined type codes.

TABLE 3

Type codes

| Name | Value | Type | Description |
|---|---|---|---|
| dsfldUNKNOWN | 0 | Unknown | Unknown format. |
| dsfldINT | 1 | Signed integer | Size must be 1, 2, 4, or 8. |
| dsfldUINT | 2 | Unsigned integer | Size must be 1, 2, 4, or 8. |
| dsfldBOOL | 3 | Boolean | Size must be 1, 2, 4. |
| dsfldFLOATIEEE | 4 | IEEE float | Size must be 4 (Single), 8 (Double), or 10 (Extended). |
| dsfldBCD | 5 | BCD | Used for BDEfldBCD. Precision and decimals are given as optional parameters. (szWIDTH, szDECIMALS). |
| dsfldDATE | 6 | Date | Size must be 4. Used for BDEfldDATE. |
| dsfldTIME | 7 | Time | Size must be 4. Used for BDEfldTIME. |
| dsfldTIMESTAMP | 8 | Timestamp | Size must be 8. Used for BDEfldTIMESTAMP. |
| dsfldZSTRING | 9 | Multi-byte string | Used for BDEfldZSTRING. Varying field with 1 or 2-byte length prefix. Field-width is given as optional parameter (szWIDTH). |
| dsfldUNICODE | 10 | Unicode string | Size is in bytes and therefore always even. Varying field with 1 or 2-byte length prefix. Field-width is given as optional parameter (szWIDTH). |
| dsfldBYTES | 11 | Bytes | Used for BDEfldBYTES, fldVARBYTES, and fldBLOB. FldBYTES is fixed-length.fldVARBYTES is variable length, with a 1 or 2-byte length prefix.fldBLOB is variable length, with a 4-byte length prefix. The subtype, if any, is given as optional parameter (SzSUBTYPE). Field-width is given as optional parameter (szWIDTH) forfldBYTES and fldVARBYTES. |

Table 4 below lists a set of type codes and the corresponding data formats.

TABLE 4

Type code examples

| Type code | Data format |
|---|---|
| 0x00010001 | 1 byte to be interpreted as an 8-bit signed integer. |
| 0x00020004 | 4 bytes to be interpreted as a 32-bit unsigned integer. |

TABLE 4-continued

Type code examples

| Type code | Data format |
|---|---|
| 0x00490001 | 1 byte length indicator followed by that many bytes of data to be interpreted as a multi-byte string value. |
| 0x004A0002 | 2 byte length indicator followed by that many bytes of data to be interpreted as a Unicode string (with half as many Unicode characters). |
| 0x004B0004 | 4 byte length indicator followed by that many bytes of data to be interpreted as a block of bytes. |
| 0x00820002 | 4 byte element count followed by that many 1 6-bit unsigned integers. |

D. Data Packet Header Layout

As previously mentioned, the first section of a data packet is the data packet header (i.e., header 410). The layout of a data packet header in the currently-preferred embodiment is illustrated by table 5 below.

TABLE 5

Data packet header layout

| Name | Type | Description |
|---|---|---|
| iMagicCookie | Int32 | Magic number (0xBDE01996). Identifies this as a data packet in WINTBL format (little endian). |
| iMajorVer | Int16 | Major version number (1). |
| iMinorVer | Int16 | Minor version number (0). |
| iHeaderSize | Int32 | Size of fixed part of header in bytes (24). |
| iColCount | Int16 | Column count. |
| | Int16 | Reserved (0). |
| iRowCount | Int32 | Row count. (0 if unknown, or if data packet only contains metadata). |
| iProperties | Int32 | pcklpropsMETADATA_INCL (1): Metadata (field descriptors, optional parameters) are included. Column descriptor section. |

Here, the iMagicCookie field allows quick validation of a data packet by checking that the first four bytes of the image contain the expected value. By including a iHeaderSize field in the header, additional fields can be added to the fixed part of the header in future versions. The beginning of the column descriptor section (described below) is found by adding the iHeaderSize field to the beginning of the header. The iColCount and iRowCount fields give the number of columns and rows in the data packet. The data packet might not contain any metadata (column descriptors, and/or optional parameters) if it is a partial data packet (i.e., iProperties contains the pcklpropsMETADATA_INCL bit). The first data packet in a series of partial data packets, should contain metadata information, but does not need to contain any data.

E. Column Descriptors

The data packet header is followed by a list of column descriptors, if the pcklpropsMETADATA_INCL bit is set in iProperties. The iColCount field in the header specifies the number of column descriptors that follows the header. The format of each column descriptor is given by table 6 below.

TABLE 6

Column descriptor layout

| Name | Type | Description |
|---|---|---|
| szColName | String | Column name. |
| IcolType | Int32 | Column type. |
| IcolAttr | Int16 | Column attributes. Optional parameters section. |

Here, the szColName is a unique name, identifying the column. The iColType field is a 32-bit type descriptor of the form (see Type descriptor format table above). The iColAttr field is a set of bit-flags representing common field attributes, as shown in table 7.

TABLE 7

Column attributes

| Name | Value | Description |
|---|---|---|
| fldAttrHIDDEN | 0x0001 | Column is hidden. |
| fldAttrREADONLY | 0x0002 | Column is read-only. |
| fldAttrREQUIRED | 0x0004 | Column requires a value (null value not allowed). |

Each column descriptor is followed by a separate optional parameters section (described below), that relates to that column only.

F. Optional Parameter Sections

As previously mentioned, a data packet includes an area called the optional parameters section, following the column descriptor section, which contains additional metadata information, like constraints, data-ordering information, and the like. In addition, each column descriptor is followed by an (possibly empty) optional parameters section.

In an exemplary embodiment, an optional parameters section comprises a 16-bit parameter count followed by that many optional parameters, as is illustrated by the following table.

TABLE 8

Optional parameters section layout

| Name | Type | Description |
|---|---|---|
| iParCount | Int16 | Optional parameter count. Optional parameters. |

An empty optional parameters section simply consists of a 16-bit zero. The layout of each optional parameter in a non-empty optional parameters section is given by table 9.

TABLE 9

Optional parameter layout

| Name | Type | Description |
|---|---|---|
| szParName | String | Parameter name. |
| iParType | Int32 | Parameter type (Type descriptor) Parameter value(s) |

The iparType field is a 32-bit type descriptor of the form (see, "Type descriptors" above). It is immediately followed by the actual parameter data. A list of predefined optional parameters is described below.

G. Row Data

The final section of a data packet is the row data. The iRowCount field in the header specifies the number of row data entries that follow the optional parameters. The format of each row data entry is given by table 10.

TABLE 10

Row data layout

| Name | Type | Description |
| --- | --- | --- |
| iRowStatus | Int8 | Row status. |
| InullBits | Int8[ ] | Null indicator bit array. Data. |

The RowStatus column contains a row status indicator. The RowStatus is used to indicate editing done to the data in the original data packet. Possible values are as follows.

TABLE 11

Row status values

| Name | Value | Description |
| --- | --- | --- |
| dsRecNotModified | 0x00 | Unmodified 'original' row. |
| dsRecOrg | 0x01 | Original version of modified row. |
| dsRecDeleted | 0x02 | Deleted row. |
| dsRecNew | 0x04 | Inserted row. |
| dsRecModified | 0x08 | Modified row. |
| dsRecunused | 0x20 | Unused row. |

When a row has been modified, a new version of that row with the changes is added, and the original row gets a RowStatus value of dsRecOrg. The modified row gets the value dsRecModified. If a row has been deleted, or inserted, they get the value dsRecDeleted or dsRecNew.

The RowStatus values can be combined to reflect multiple modifications to the same row, such as when a modified record is modified again or an inserted record is deleted. In the first case, the original row would have a RowStatus value of dsRecOrg, the modified row with the first change would have the value dsRecOrc+dsRecModified, and the modified row with the second change would have the value dsRecModified. In the second case, the RowStatus value would be dsRecNew+dsRecDeleted. In general, in order to see the most current version of the rows, the RowStatus can be tested against dsISVISIBLE=NOT (dsRecDeleted+dsRecOrg+dsRecuUnUsed).

The iNullBits field is a bit array with two-times iColCount entries. The two least significant bits (0x01, 0x02) of the first byte correspond to the first column, the next two bits (0x04, 0x08) correspond to the second column, and so on for the first eight columns. The following bytes (if any) represent groups of eight columns in the same fashion. The total number of bytes occupied by the iNullBits field is (2*iColCount+7) div 8. If any of the 2 bits for a given column is set, the column is blank (null). Otherwise, if both the bits for a given column are clear (0), the column is not blank. The 2 bits for each value is used to distinguish between an actual NULL-value (1), and a special state of "unchanged" (2), as compared to a value in some other row, which makes it unnecessary to include it in the data packet (see e.g., delta data packet description). Possible blank-values are illustrated by the following table.

TABLE 12

Lists the possible blank-values

| NullBits (for each column) | Value | Description |
| --- | --- | --- |
| NO_BLANK | 0 | Contains non-Null value. |
| BLANK_NULL | 1 | Contains Null-value. |
| BLANK_UNCHANGED | 2 | Contains 'unchanged' Null-value. |

The iNullBits field is followed by the actual data for the row. The data consists of an entry for each non-null column, the format of which is given by the iColType field in the corresponding column descriptor. Notice that if a column is null, no data is present for that column. Each of the iRowStatus and iNullBits fields does not have a corresponding column descriptor; they are not counted in the iColCount field, since they are always present.

H. Predefined Optional Parameters

In the currently-preferred embodiment, optional parameters include the following.

TABLE 13

Predefined optional parameters.

| Attribute name | Type descriptor | Description |
| --- | --- | --- |
| szDEFAULT_ORDER | dsfldUINT Int16[ ] | Describes the order of the data rows, if any. The array contains the column numbers of the columns used to order the data. The column numbers are 1-based, and are contained in the lower 12-bit of each integer. The upper 4 bits are used to indicate special attributes for the column ordering, like whether the column is case-insensitive, or is sorted in descending order. This parameter allows the data in a data packet to be viewed and inserted in the order of the original data. It can be combined with the szUNIQUE_KEY parameter to simulate a primary index. |

TABLE 13-continued

Predefined optional parameters.

| Attribute name | Type descriptor | Description |
| --- | --- | --- |
| szUNIQUE_KEY | dsfldUINT Int16[ ] | Describes a set of columns in the data rows, that must be considered unique. The column numbers are 1-based.<br>This parameter allows the update-semantics of a unique key to be enforced on the data in a data packet. More than one unique key can be specified. |
| szCHANGE_LOG | dsfldUINT Int32[ ] | Describes the editing changes made to the data in a data packet, if any. Each edit consists of a series of 3 integers, with the following format:<br><RowNo1><RowNo2><EditAction><br>where RowNo1 indicates the row (1-based) that was edited, RowNo2 is the new version of the row (if any), and EditAction is one of the following: dsRecModified, dsRecDeleted, or dsRecNew.<br>This parameter makes it possible to undo changes in the reverse order in which they were applied. |
| szSERVER_COL | dsfldZSTRING String | Name of collation sequence used to order data, if any. Informational only. |
| sZLCID | dsfldUINT Int32 | LCID or language driver used to order the data. (typically, Windows specific).<br>This parameter allows the data in a data packet to be ordered using the collation sequence of the original data source. |
| szREADONLY | dsfldBOOL Bool16 | If True (1), indicates that the data in the data packet is not updateable. |
| szWIDTH | dsfldUINT Int16 | Column optional parameter for variable length columns, is used to describe the (maximum) width of a column. Similar to iUnits1 in BDE. |
| szDECIMALS | dsfldUINT Int16 | Column optional parameter for fixed decimal type columns (BCD). Similar to iUnits2 in BDE. |
| szSUBTYPE | dsfldZSTRING String | Column optional parameter to describe the subtype of a column. Similar to iSubType in BDE. |
| szDATASET_DELTA | dsfldBOOL Bool16 | If True (1), indicates that the data packet is a Delta-data packet, and is subject to special semantics. |
| szDATASET_CONTEXT | dsfldBYTES Int8[ ] | This parameter carries information, that can be used when resolving a Delta-data packet update request<br>The information is application specific. |
| szBDEDOMX | dsfldBYTES Int8[ ] | Contains description of domain constraints.<br>This parameter allows for domain constraints to be enforced on the data in a data packet, in the same manner they would be enforced at the original data source.<br>The description is BDE specific. |
| szBDERECX | dsfldBYTES Int8[ ] | Contains description of record constraints.<br>This parameter allows for record constraints to be enforced on the data in a data packet, in the same manor they would be enforced at the original data source.<br>The description is BDE specific. |
| szBDEDEFX | dsfldBYTES | Contains description default |

TABLE 13-continued

Predefined optional parameters.

| Attribute name | Type descriptor | Description |
| --- | --- | --- |
| | Int8[ ] | values. This parameter allows for default values to be used when adding a new row to the data in a data packet. The description is BDE specific. |
| szAUTOINCVALUE | dsfldINT Int32 | Indicates the next value to use in a column of the type autoincrement, in case a new row is inserted. This parameter can be used to simulate the semantics of an autoincrement field. |

I. Delta Data Packet

The "delta" data packet describes updates made to data from an original data packet. These updates are in a form that allows a resolver to apply them to the original data source. The updates are contained in the data rows, and the update action (modify/inserted/deleted) are indicated using the RowStatus column. The column descriptors are identical to the ones in the original data packet. The following table outlines how the data is interpreted.

not contain optional parameters describing update-semantics, the edit-log, or any ordering information, that was part of the original data packet). In this manner, complexities involving processing of edit-log or ordering information for a delta packet are avoided.

J. Error Data Packet

The error data packet is returned from a resolver to report the results, including informing the client of an update request failure. The error data packet contains one row for each failed update-request. The rows have a number of

TABLE 14

Updates contained in a delta data packet.

| Update request | RowStatus value | Description of data in row |
| --- | --- | --- |
| Deleted | dsRecDeleted | The row contains all values and Nulls from the original row, with the possible exception of fields that are not needed in order to find the original row on the server, and/or are too big (like blob-fields). Field values which are not included, has the special blank-value of BLANK_UNCHANGED (2). For these fields, the resolver will not be able to detect whether another user changed them or not (which could be considered an error). |
| Inserted | dsRecNew | The row contains values (or blanks) for all the fields. |
| Modified | dsRecorg | The row contains all values from the original row, with the same exceptions as mentioned above for deletion. This row is always followed immediately by a row with the RowStatus of dsRecModified. |
| | dsRecModified | This row only contains values (and Nulls) for the fields that was changed as compared to the original row. All other fields have the special blank-value of BLANK_UNCHANGED. |

The delta data packet contains one row for each Delete and Insert request, and two rows for each Modify request. The order of the rows should preferably be the same as the order in which the updates were performed by the client. In order to simplify the update actions that the server is supposed to execute, the currently-preferred embodiment restricts a delta packet from being partial or being updated (so that it does predefined columns, followed by all the columns of the original data packet. The latter are used to return the values of a conflicting row, if any, to the client. The following table outlines the meaning of the predefined columns used for error data packets.

TABLE 15

Layout of error data packet.

| Column | Column name | Type | Column description |
| --- | --- | --- | --- |
| 1 | szdsERRRECORDNO | Int32 | Row number (1-based) of row in Delta-data packet, that failed. |

TABLE 15-continued

Layout of error data packet.

| Column | Column name | Type | Column description |
|---|---|---|---|
| 2 | szdsERRRESPONSE | Int32 | Resolver responded with this action: Skip, Abort, Merge, |
| 3 | szdsERRMESSAGE | String | The message associated with the failure. |
| 4 | szdsERRCONTEXT | String | Additional context, if any. |
| 5 | szdsERRCATEGORY | Int32 | The error category. |
| 6 | szdsERRCODE | Int32 | The native errorcode. |
| 7 . . . n | | | The columns of the original data packet. If any of these fields contains a value other than NULL(1), including BLANK_UNCHANGED. |

K. Partial Data Packets

In a "partial" data packet the total data content is divided into multiple data packets. In order to reduce overhead, only the first data packet contains metadata describing the data. The subsequent data packets merely contain the fixed size header and actual data contained in data-rows. The iProperties of the fixed size header, indicates whether a data packet contains metadata or not (pcklpropsMETADATA_INCL).

L. Creation of Data Packets

In order to promote compatibility, a standardized interface for the creation of data packets is preferred, as represented by the following application programming interface (API).

```
//Add an optional parameter DBIResult AddAttribute
    (PCKLATTRArea eAttrArea, pCHAR pszAttr,
UINT32 iType, UINT32 iLen, pBYTE pValue);
//Return pointer to the finished 'safearray'
DBIResult GetData packet (SAFEARRAY **ppSa);
// Get the size of the safearray.
DBIResult GetSize(pUINT32 piData packetSize);
// Add this field to the data stream.
DBIResult PutField (PCKLFldStauts eFldStatus, UINT32
    iLhen, pBYTE pSrc);
// Add a column descriptor.
DBIResult AddColumnDesc (pDSData packetFLDDesc
    pFldDes);
```

M. Reading of Data Packets

In order to promote compatibility, a standardized interface for the reading of data packets is proposed, as represented by the following application programming interface (API).

```
// Adds additional 'partial' data packet for extraction
DBIResult AddData packet(SAFEARRAY
    *pdatapacket);
// Extract the next column descriptor.
DBIResult GetColumnDesc (pDSData packetFLDDesc
    pFldDes);
// Extract length of next attribute
DBIResult GetAttributeLength (pUINT32 piLenqth);
// Extract next attribute
DBIResult GetNextAttribute (pCHAR pszAttribute,
    pUINT32 piType, pUINT32 piLen, pBYTE pValue);
// Get length of next field DBIResult GetFieldLength
    (pUINT32 piLength);
// Extract next field
DBIResult GetField (pUINT32 piLength, pBYTE pValue,
    pBOOL pblank);
```

N. Data Packet Support of Briefcase Model

The data packet of the present invention can be "persisted"—that is, written out to disk as a persistent image. By embedding the deltas within the data packet, the system can persist the data set even after updates have been made. Applying the well-known "Briefcase model" (e.g., as provided by Windows 95 and described by the on-line help therein, under "Briefcase"), the user can disconnect the client from the network and still access the data. Specifically, the user saves a remote data set to local disk (e.g., on a laptop computer) and disconnects from the network. Nevertheless, the user can still edit the data at a remote location without connecting to the network. At a convenient point in time, the user can reconnect to the network and update the database accordingly. Here, the user's machine does not have to actually be connected to the server at all times in order for the user to work with the data. This allows the client to operate remotely from the data source and is, thus, ideal for laptop users or for sites where minimum network or database traffic is desired.

O. Summary of Overall Methodology

Figure 5:
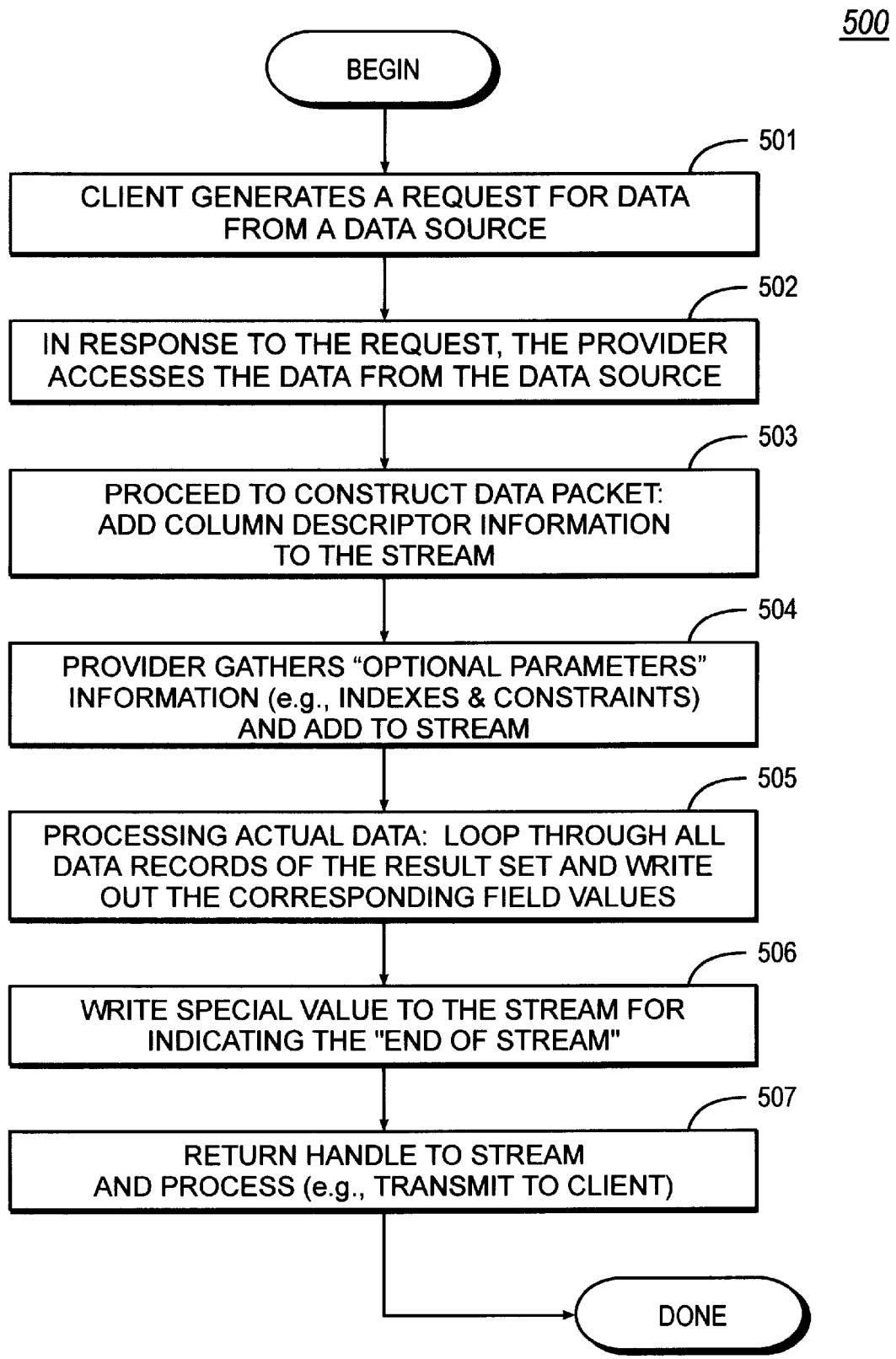
FIG. 5 is a flow chart summarizing the overall methodology of the present invention.

Referring now to FIG. 5, a flow chart 500 summarizing the overall methodology of the present invention is illustrated. At step 501, a client generates a request (e.g., SQL statement) for data from a data source, such as a relational database table stored on a back end server. In response to this request, at step 502, the provider accesses the data from the data source; it may now proceed to construct a data packet. In particular, the provider creates a data packet header comprising a metadata and optional parameters. Since stream I/O is employed, the provider can sequentially read column descriptor information from the data source (e.g., cursor handle on a result table) and then stream out corresponding metadata. After the column descriptor information has been added to the stream, at step 503, the provider proceeds to gather other information, such as relevant indexes and constraints (e.g., from the cursor). This information is added one by one to the stream as optional parameters, at step 504. In an exemplary embodiment, each attribute is added in the form of an attribute name following by an attribute value (e.g., as it in the manner used for Microsoft Windows .ini file). After all attribute information has been streamed out, the system may begin reading and processing actual data.

Processing of actual data also occurs sequentially, as the information is being written out to the stream. In particular, the system loops through all data records of the result set and writes or streams out the corresponding field values, at step 505. Here, only actual data up is written out. Since the client can correctly interpret the stream from the descriptors, empty fields (e.g., ones containing padding) are not written out. After all fields of all records have been processed, a special value is written to the stream for indicating the "end of stream," at step 506. At this point, the system returns a handle for the stream, at step 507, which can be passed off to other parts of the system (e.g., network transport). At this point, the memory containing the data packet stream can be treated generically, including writing the data packet to disk. Since the data packet is a stream, it can be simply re-directed to disk, for retrieval at a later time.

Figure 6:
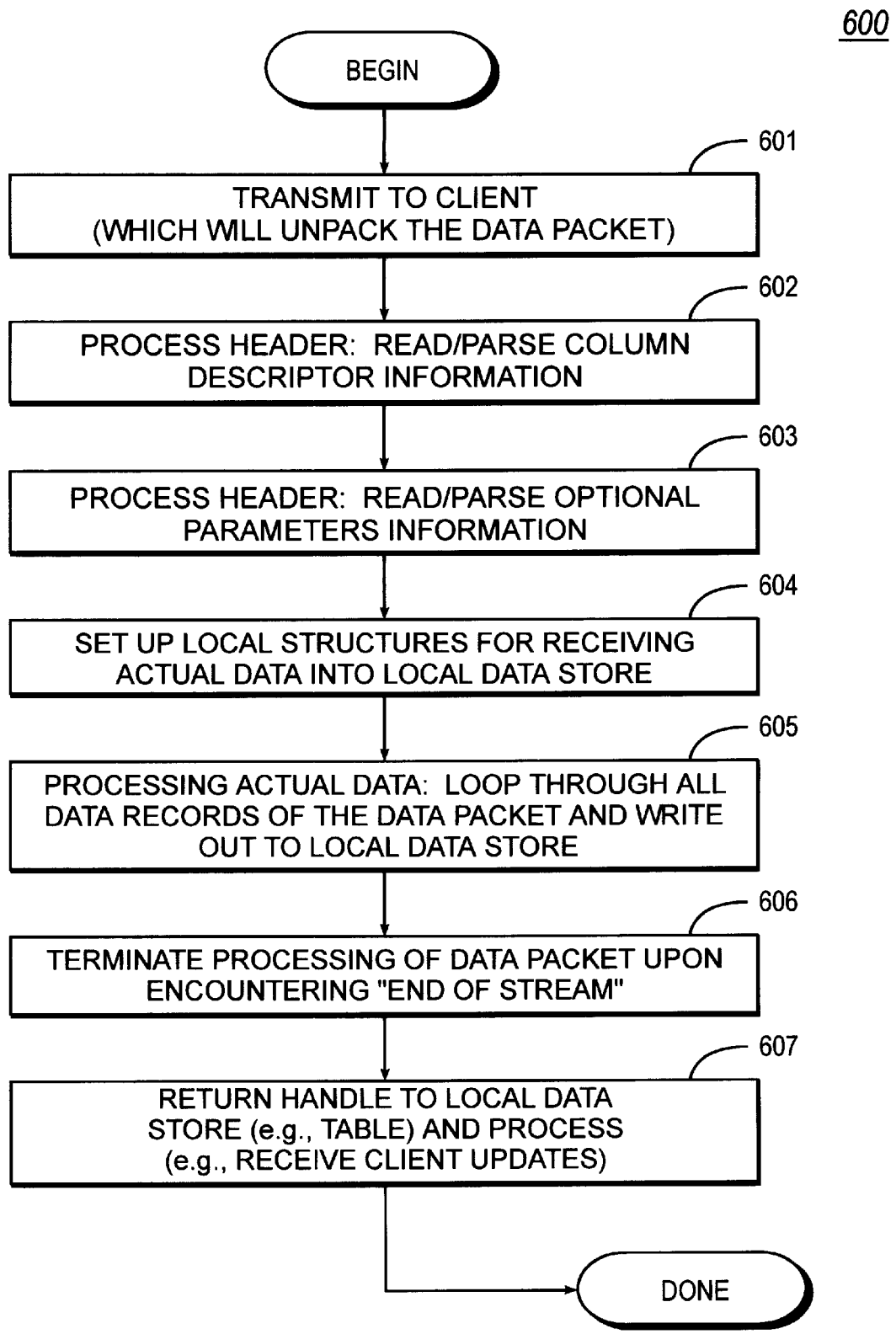
FIG. 6 is a flow chart summarizing the methodology of processing a data packet at a client.

Processing at the client occurs in a similar manner, on a first-in, first-out basis, as indicated by flow chart 600 in FIG. 6. After the data packet is transmitted to the client, at step 601, the client starts the unpacking process by reading the data packet header for processing the column descriptors (step 602) and optional parameters (step 603). With this information, the client can set up a local data store for receiving the actual data, as indicated at step 604. Thereafter, the client can proceed to process the individual data records, at step 605, using the metadata information for correctly interpreting the stream. In this manner, the data is correctly reconstituted at the client (e.g., in a local data store). Processing of the stream itself terminates upon encountering the "end of stream" token, at step 606. Now, the data exists at the client and the data packet may be discarded. From the point of view of the client application, the data appears the same as if it were a local table. The client at this point would typically return a handle or cursor to a local table, for receiving updates from that client, as shown in step 607.

In addition to the regular data packet outlined above, the system employs a "partial" data packet in those instances where it is necessary to spread the data out among multiple data packets. Consider, for instance, a scenario where the client only desires the first 50 data records of a result set. Here, a regular data packet can be sent to the client containing those first 50 records. Should the client then request the next 50 records (e.g., "fetch next"), a partial data packet can be sent containing only those next data records; in particular, the metadata information is not transmitted since the context is already known at that time.

Once the data is at the client, it is subject to one of three operations or actions: insert, delete, and modify. Each of these actions creates data up for the delta data packet. For instance, an insert action creates an insert record indicating those records which have been inserted at the client. A delete action, on the hand, creates a record which includes the original data, so that the resolver can locate the original data record (present on the back end). The resolver can determine whether the data record has already been changed by another client by performing a field-by-field comparison for the record. In this manner, the resolver can re-examine data records on the back end for determining whether they have been already changed by another client. If a record has already been modified or deleted by another client, the resolver reports the error via an error data packet, for notifying the client of the condition.

In the case of a modify action, the system transmits two records: the original data record and the new, modified data record. The transmission is optimized, however, to only transmit those fields in the modified data record which have changed (as compared to the original record). In a manner similar to that done for the delete action, the resolver examines the data record present on the back end for determining which fields have been modified by another client. Depending on desired implementation, resolver logic can be applied for accepting or rejecting client modifications to particular field values, based on previously-made modifications by another client. In a typical implementation, modifications of the client would be accepted if they do not conflict with previously-made modifications of another client (i.e., ones made to fields other than those modified by the posting client). Otherwise, feedback information is provided to the client so that the client can decide how to proceed (e.g., supply new modifications or cancel the operation).

In the currently-preferred embodiment, the delta data packet transmits data records which contain records IDs identifying their particular type. A delete record, for example, includes a record ID of type "delete", followed by relevant values (i.e., the original data record, as described above for a delete record). With this approach, the delta data packet can be unpacked using the same mechanism for unpacking a regular data packet.

While the invention is described in some detail with specific reference to a single-preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. In a database environment, a method for providing a database client with data access to information from database tables, the method comprising:

generating at the client a request for access to particular information from one or more database tables;

in response to the request for access to said particular information, retrieving a result set corresponding to the requested particular information;

transmitting to the client said result set by means of a data packet comprising descriptor information together with field values from the result set; and upon receipt of the data packet at the client, unpacking the data packet by:

based on said descriptor information, creating a local data store at the client capable of storing the result set, and recreating the result set at the local data store based on field values from the data packet, such that the client has local access to the result set;

receiving modifications to the result set at the client;

creating a delta data packet at the client for transmitting said modifications back to said one or more database tables from which the particular information was first retrieved;

wherein said modifications comprise insert, delete, and update operations performed at the client on individual data records of the result set; and wherein said delta data packet transmits for an update operation both original and updated field values for a data record which has been updated in the result set at the client.

2. The method of claim 1, wherein each database table comprises an SQL database table.

3. The method of claim 1, wherein said client comprises a client application operating on a client machine.

4. The method of claim 1, wherein said request for access to particular information comprises a database query received from the client.

5. The method of claim 4, wherein said database query comprises an SQL query received from the client.

6. The method of claim 1, wherein said request for access to particular information is transmitted to a provider component responsible for communicating with a back end database server.

7. The method of claim 6, wherein said provider component resides on a middle tier connecting the client to a back end database server.

8. The method of claim 6, wherein said transmitting step includes:

retrieving the result set by the provider component; and creating at the provider component a data packet suitable for transmitting the result set to the client.

9. The method of claim 1, wherein said descriptor information comprises column descriptor information describing attributes for database columns present in the result set.

10. The method of claim 9, wherein said column descriptor information includes a column name and data type for each database column present in the result set.

11. The method of claim 1, wherein said descriptor information comprises optional information indicating constraints present on the result set.

12. The method of claim 11, wherein said constraints include a referential integrity constraint present on the result set.

13. The method of claim 11, wherein said constraints include a primary key constraint present on the result set.

14. The method of claim 1, wherein said descriptor information comprises optional information indicating index information about the result set.

15. The method of claim 1, wherein said data packet eliminates from transmission any fields in the result set which do not contain actual values.

16. The method of claim 1, wherein said delta data packet transmits for an insert operation field values for a data record inserted into the result set at the client.

17. The method of claim 1, wherein said original field values for the data record which has been updated are used to determine whether a corresponding data record from the database tables has been changed by another client.

18. The method of claim 17, further comprising:

transmitting back to the client an error data package if the data record corresponding to the updated data record has already been changed by another client.

19. The method of claim 1, further comprising:

dividing the result set into subsets for transmission to the client; and transmitting the subsets to the client a plurality of partial data packets, where only one of the partial data packets stores said descriptor information.

20. In a database environment, a method for providing a database client with data access to information from database tables, the method comprising:

generating at the client a request for access to particular information from one or more database tables;

in response to the request for access to said particular information, retrieving a result set corresponding to the requested particular information;

transmitting to the client said result set by means of a data packet comprising descriptor information together with field values from the result set; and upon receipt of the data packet at the client, unpacking the data packet by:

based on said descriptor information, creating a local data store at the client capable of storing the result set, and recreating the result set at the local data store based on field values from the data packet, such that the client has local access to the result set;

receiving modifications to the result set at the client;

creating a delta data packet at the client for transmitting said modifications back to said one or more database tables from which the particular information was first retrieved;

wherein said modifications comprise insert, delete, and update operations performed at the client on individual data records of the result set;

wherein said delta data packet transmits for a delete operation field values for a data record which has been deleted from the result set at the client; and wherein said field values for the data record which has been deleted are used to determine whether a corresponding data record from the database tables has been changed by another client.

21. The method of claim 20, further comprising:

transmitting back to the client an error data package if the data record corresponding to the deleted data record has already been changed by another client.

* * * * *